US009251835B2

(12) United States Patent
Grobis et al.

(10) Patent No.: US 9,251,835 B2
(45) Date of Patent: Feb. 2, 2016

(54) PATTERNED MAGNETIC MEDIA WITH OFFSET DATA AND SERVO REGIONS

(71) Applicant: HGST Netherlands B.V., Amsterdam (NL)

(72) Inventors: Michael K. Grobis, San Jose, CA (US); Jeffrey S. Lille, Sunnyvale, CA (US); Ricardo Ruiz, San Bruno, CA (US)

(73) Assignee: HGST Netherlands B.V., Amsterdam (NL)

( * ) Notice: Subject to any disclaimer, the term of this patent is extended or adjusted under 35 U.S.C. 154(b) by 154 days.

(21) Appl. No.: 13/909,906

(22) Filed: Jun. 4, 2013

(65) Prior Publication Data

US 2013/0265673 A1 Oct. 10, 2013

Related U.S. Application Data

(62) Division of application No. 13/180,405, filed on Jul. 11, 2011, now Pat. No. 8,475,670.

(51) Int. Cl.
| | | |
|---|---|---|
| *G11B 5/74* | (2006.01) | |
| *G11B 5/596* | (2006.01) | |
| *G11B 5/855* | (2006.01) | |
| *B82Y 10/00* | (2011.01) | |

(52) U.S. Cl.
CPC ............. *G11B 5/746* (2013.01); *B82Y 10/00* (2013.01); *G11B 5/59688* (2013.01); *G11B 5/855* (2013.01); *Y10T 29/4902* (2015.01)

(58) Field of Classification Search
None
See application file for complete search history.

(56) References Cited

U.S. PATENT DOCUMENTS

| | | | |
|---|---|---|---|
| 5,724,336 A | 3/1998 | Morton | |
| 6,421,195 B1 | 7/2002 | Rubin et al. | |
| 7,009,791 B2 | 3/2006 | Shimatani | |
| 7,046,476 B1 | 5/2006 | Albrecht et al. | |
| 7,575,705 B2 | 8/2009 | Sakurai et al. | |
| 7,643,234 B2 | 1/2010 | Albrecht et al. | |
| 8,475,670 B2 | 7/2013 | Grobis et al. | |
| 2005/0069732 A1 | 3/2005 | Kamata et al. | |
| 2006/0007590 A1* | 1/2006 | Nagasaka | 360/77.08 |
| 2006/0126208 A1* | 6/2006 | Kitamura et al. | 360/51 |
| 2007/0070547 A1 | 3/2007 | Kamata et al. | |
| 2007/0116989 A1 | 5/2007 | Ikekame et al. | |

(Continued)

FOREIGN PATENT DOCUMENTS

| | | |
|---|---|---|
| JP | 2002093083 | 3/2002 |
| JP | 2005293662 | 10/2005 |

(Continued)

OTHER PUBLICATIONS

English abstract of JP 2010-80011, Japan, Apr. 2010.*
Restriction/Election from U.S. Appl. No. 13/180,405, dated Sep. 12, 2012.

(Continued)

*Primary Examiner* — Holly Rickman
(74) *Attorney, Agent, or Firm* — Zilka-Kotab, PC

(57) ABSTRACT

A patterned magnetic media having offset servo and data regions. The media can be constructed by a method that allows both a data region and a servo region to be patterned without the patterning of one region adversely affecting the patterning of the other region. The method results in a patterned data region a patterned servo region and intermediate regions between the servo and data regions. The intermediate regions, which are most likely, but not necessarily, asymmetrical with one another indicate that the method has been used to pattern the media.

10 Claims, 19 Drawing Sheets

(56) References Cited

U.S. PATENT DOCUMENTS

| | | |
|---|---|---|
| 2008/0002295 A1 | 1/2008 | Sakurai et al. |
| 2008/0151410 A1 | 6/2008 | Yasui et al. |
| 2009/0166321 A1 | 7/2009 | Albrecht et al. |
| 2009/0321388 A1* | 12/2009 | Okino et al. ............ 216/22 |
| 2010/0081010 A1 | 4/2010 | Tatsugawa et al. |
| 2010/0128384 A1* | 5/2010 | Shibano ............ 360/75 |
| 2010/0237042 A1 | 9/2010 | Nguyen et al. |
| 2011/0236595 A1* | 9/2011 | Kodama et al. ............ 427/553 |

FOREIGN PATENT DOCUMENTS

| | | |
|---|---|---|
| JP | 2008041228 | 2/2008 |
| JP | 2009238358 | 10/2009 |
| JP | 2009245488 | 10/2009 |
| JP | 2010244598 | 10/2010 |

OTHER PUBLICATIONS

Notice of Allowance from U.S. Appl. No. 13/180,405, dated Mar. 1, 2013.

* cited by examiner

PATTERNED MAGNETIC MEDIA WITH OFFSET DATA AND SERVO REGIONS

RELATED APPLICATIONS

The present Application is a Divisional Application of commonly assigned co-pending U.S. patent application Ser. No. 13/180,405, filed Jul. 11, 2011, entitled METHOD FOR MANUFACTURING A PATTERNED MAGNETIC MEDIA WITH OFFSET DATA AND SERVO REGIONS, which is incorporated herewith by reference.

FIELD OF THE INVENTION

The present invention relates to magnetic data recording and more particularly to a method for manufacturing a magnetic media with self assembled data regions and integrated servo patterns.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes linearly with the magnitudes of the magnetic fields from the rotating disk. When a sense current is conducted through the spin valve sensor, resistance changes cause potential changes that are detected and processed as playback signals.

As data density increases, the spacing between data bits becomes ever smaller. This can lead to adjacent bits erasing one another, otherwise adversely affecting one another. In addition, data from adjacent up-track or down-track bits or bits on adjacent track of data can blur into one another making it difficult to read back a useful signal.

SUMMARY OF THE INVENTION

The present invention provides a patterned magnetic media that includes: a patterned data region; a patterned servo region having first and second sides; a first intermediate region between the servo region and data region at the first side of the servo region; and a second intermediate region between servo region and the data region at a second side of the data region.

The patterned media can be constructed by a method that includes, providing a wafer, the wafer having a data region and a servo region, and then patterning a data pattern in the data region while the servo region is protected by a first mask. A servo pattern is then patterned in a servo region while the data region is protected by a second mask.

The method can include, providing a wafer having a first region and a second region, depositing a first layer of hard mask material, and patterning the first layer of hard mask with a first pattern. A first protective mask can then be formed, the first protective mask covering at least a portion of the second region and leaving at least a portion of the first region uncovered. A first material removal process can then be performed to remove portions of the wafer that are not protected by the patterned first layer of hard mask material or the first protective mask to from a recessed pattern in the first region. The first protective mask can then be removed as well as the first layer of hard mask material. A second layer of hard mask material can then be deposited, and a second protective mask formed, the second protective mask covering at least a portion of the first region and leaving at least a portion of the second region uncovered. The second layer of hard mask material can then be patterned and a second material removal process performed to remove a portion of the wafer that is not protected by the patterned second layer of hard mask material or the second protective mask to form a recessed pattern in the second region.

The processes can be used to form the wafer into a master die that can be pressed against a magnetic disk to pattern the disk to form a patterned media. The above process advantageously allows both the servo region and the data region to be patterned without the patterning of one region negatively affecting the patterning of the other region.

The process results in a patterned magnetic media that has: a patterned data region; a patterned servo region having first and second sides; a first intermediate region between the servo region and data region at the first side of the servo region; and a second intermediate region between servo region and the data region at a second side of the data region.

The first and second intermediate regions indicate that a process according to the invention has been used to manufacture the disk. The first and second intermediate regions, are most likely but not necessarily asymmetrical to each other.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
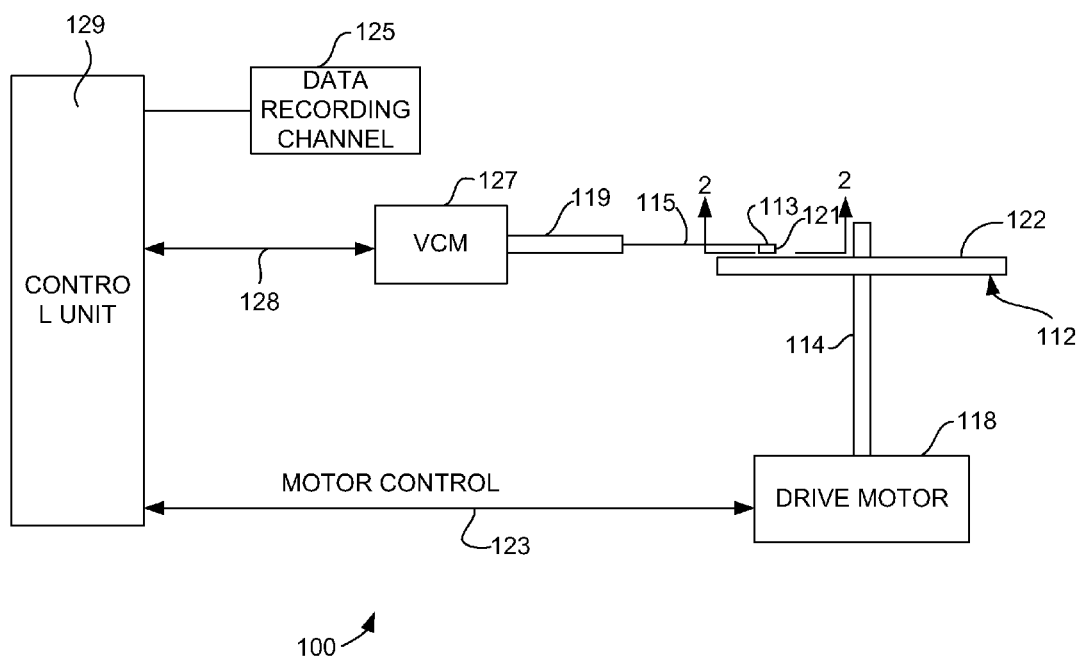
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

As data density requirements increase it becomes necessary to space tracks of data and individual bits of data ever closer together. As the size of bits and spacing between the tracks and bits decreases adjacent track interference becomes a problem. It becomes ever more difficult to distinguish bits of data from one another and also becomes very difficult to write one bit of data without inadvertently writing to an adjacent bit or adjacent track of data.

One way to mitigate this problem is to pattern the media during manufacture. For example, the media can be etched so that the data tracks are raised, while the spaces between the tracks are recessed as grooves. This physically separates the tracks, making it much easier to distinguish tracks. This can be referred to as patterned track media. In addition, the individual bits of data can be similarly patterned such that each bit is physically separated from the bits that are up-track or down-track from it by recesses or grooves. This can be referred to as bit patterned media. The grooves separating the tracks then appear as concentric rings, whereas the grooves separating the individual bits resemble lines emitting radially from the center of the disk.

However, in order for the recording system to work properly, in addition to the data tracks recorded on the disk, the disk must also include servo tracks which are used to determine the radial location of the magnetic head over the disk at any given time. These servo tracks look much different from the data tracks (as will be seen), and the servo regions are configured as curved spokes that extend outward from the center of the disk. Because the servo tracks extend in a completely different direction from the data tracks and have a completely different pattern than the data tracks, there has not previously been a practical method for constructing both of these features on a disk. The present invention overcomes this issue by providing a way to effectively pattern both servo and data tracks on a disk.

Figure 2:
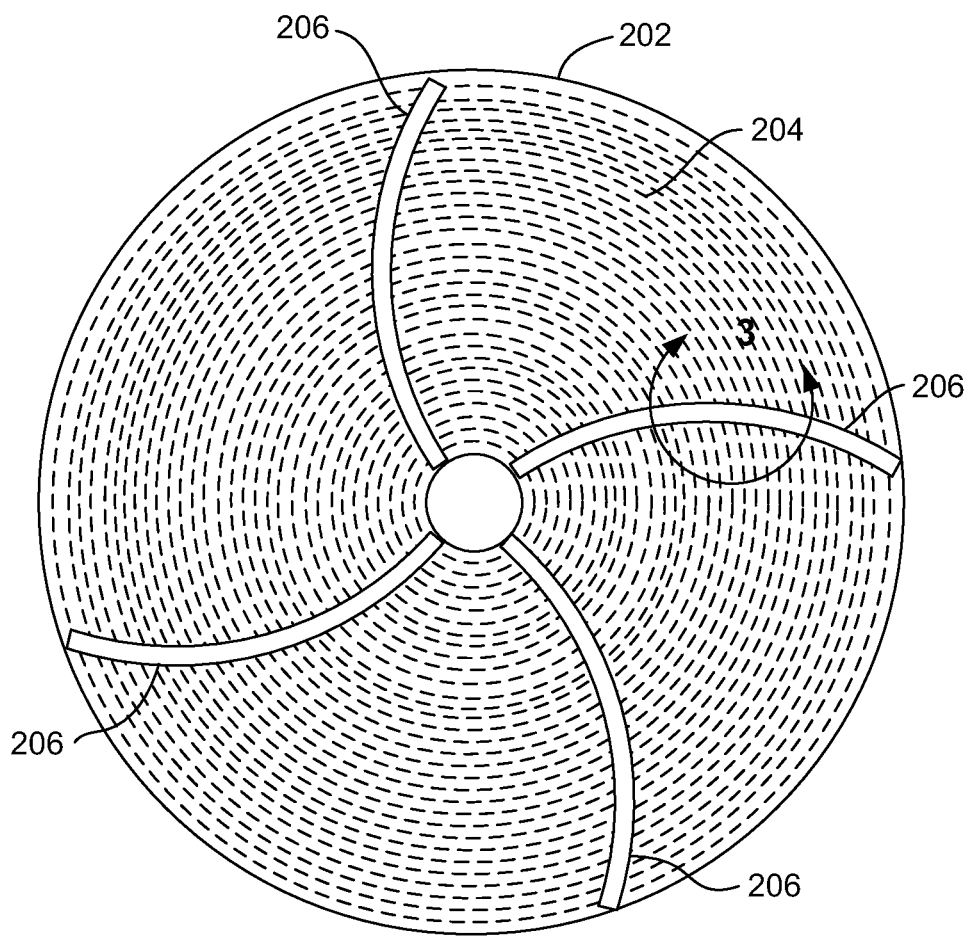
FIG. 2 is top down view of a bit patterned media manufactured according to an embodiment of the invention.

FIG. 2 shows a top down view of a magnetic disk 202 according to an embodiment of the invention. As can be seen, in FIG. 2, the disk 202 is configured with concentric rings of data tracks 204. The data tracks 204 are shown as dashed lines in FIG. 2 to indicate that they are actually individual raised bits arranged in concentric data rings. Also as can be seen in FIG. 2, the disk 202 includes servo tracks 206 that are arranged as curved portions extending from the center of the disk 202. The curved shape of these servo track regions 206 resemble the arcuate path that a slider would make over the disk when moved across the disk by an actuator arm.

Figure 3:
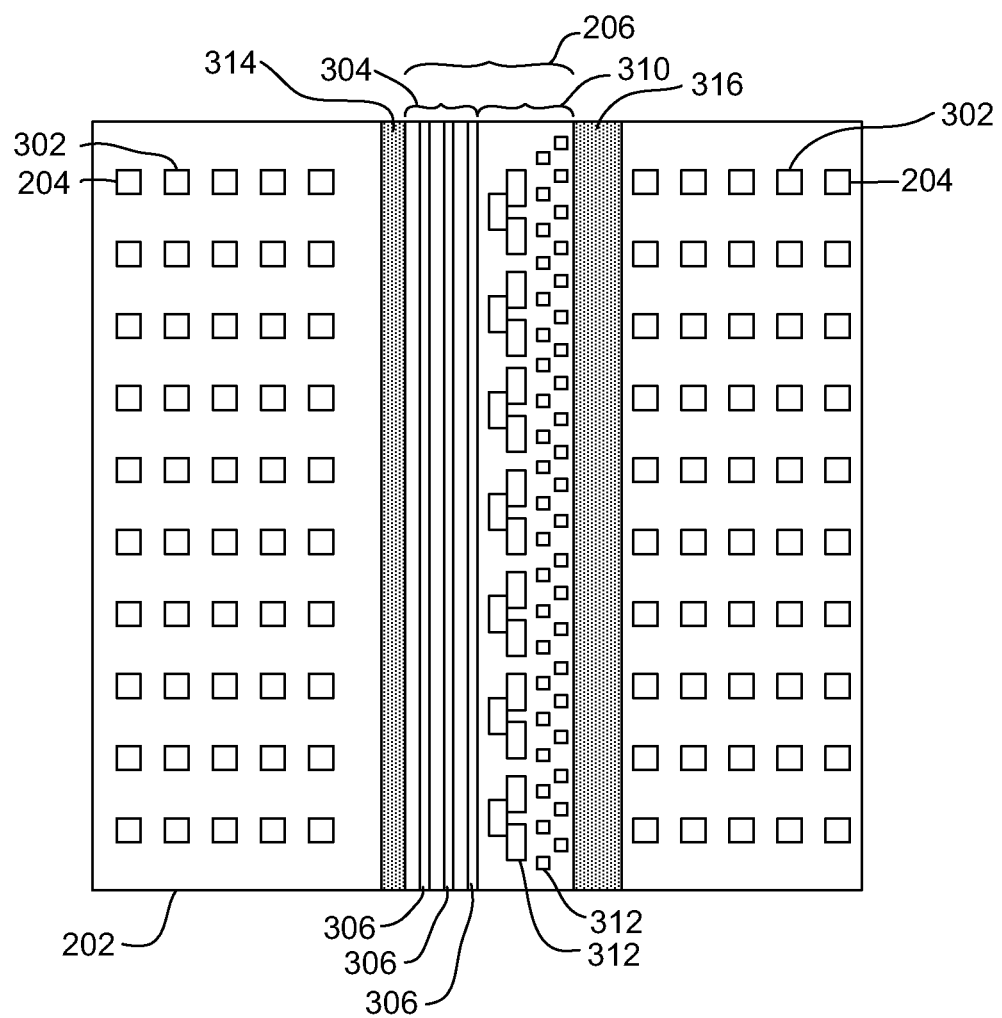
FIG. 3 is an enlarged view as seen from circle 3 of FIG. 2, showing a data track patterned data track and a patterned servo track.

FIG. 3 shows an enlarged view of a portion of the disk 202 as seen from circle 3 of FIG. 2, and shows a portion of a servo track 206 within and crossing data tracks 204. In FIG. 3 it can be seen that the data tracks 204 are made up of individual patterned bits 302. While only two of the data tracks 204 and data bits 302 are labeled, it should be understood that these labels apply to all of the other similar data tracks 204 and data bits 302 shown in FIG. 3. The data bits 302 are formed as raised portions that would extend out of the page as shown in FIG. 3.

The magnetic media 202 as shown in FIG. 3 also includes a servo track 206. At one side of the servo track 206 is a timing track section 304, which includes a series of timing tracks 306 that are spaced apart by a desired spacing and which allow the signal processing software to establish speed and timing of the slider over the data track region before reaching a servo data region 310. The servo data track region includes a series of raised servo data bits 312 that are configured to allow signal processing electronics to determine the location of the slider over the disk media 202.

As can also be seen, the media 202 also includes non-data regions 314, 316 at either side of the servo track, which are shown in shadow in FIG. 3. These regions 314, 316 are most likely, although not necessarily, asymmetrical in that one is most likely wider than the other. These regions 314, 316 may contain patterned bits or remnants of bits, but have no actual meaning as servo data or recording data. These regions 314, 316 are actually by-products of a process that can effectively allow the servo track 206 and data tracks 204 to be patterned on a magnetic media. This method will be described further below.

Figure 4:
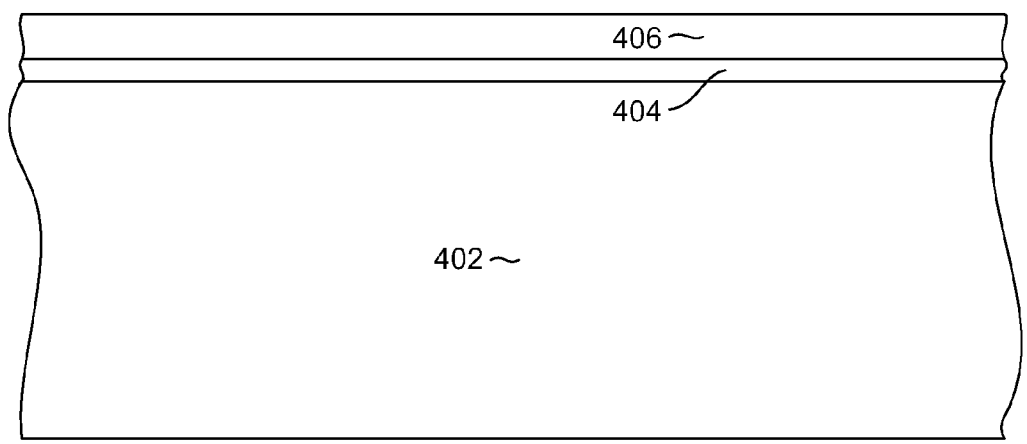
FIGS. 4-19 are views of a portion of a magnetic disk in various intermediate stages of manufacture, illustrating a method for manufacturing a magnetic media/disk according to an embodiment of the invention.

FIGS. 4 through 19 illustrate a method for manufacturing a magnetic media according to an embodiment of the invention. With particular reference to FIG. 4, a wafer 404 is provided that will become a die or imprint tool for imprinting a data pattern (data and servo) onto a magnetic disk. The wafer 402 is preferably a hard material that can be etched by Reactive Ion Etching (RIEable material). To this end, the wafer can be constructed of silicon. A first hard mask layer 404 is deposited over the wafer and a first layer of photoresist material 406 is deposited over the hard mask layer 404. The hard mask layer 404 can be a material such as Cr or a multi-layer stack of materials, which can be removed by reactive ion etching.

Figure 5:
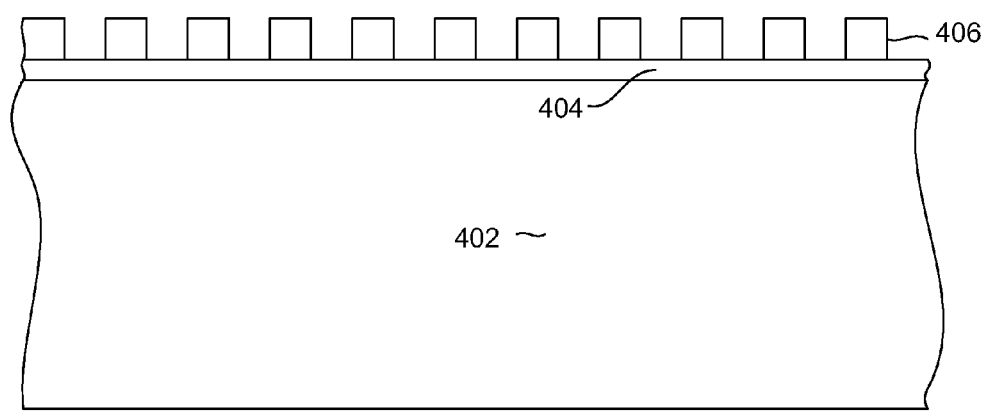

The photoresist layer 406 is then photolithographically patterned and developed to form a first photo mask a shown in FIG. 5. The photolithography is preferably an electron beam photolithography, which provides good resolution at small feature sizes. This first mask pattern 406 as shown in FIG. 5 can be a pattern of concentric data track rings, which are shown in cross section in FIG. 5. Therefore, the cross section shown in FIG. 5 is along a plane that is parallel with a radial of the wafer. An alternate (or additional) masking layer may contain a block copolymer (BCP) to produce periodic structures.

Figure 6:
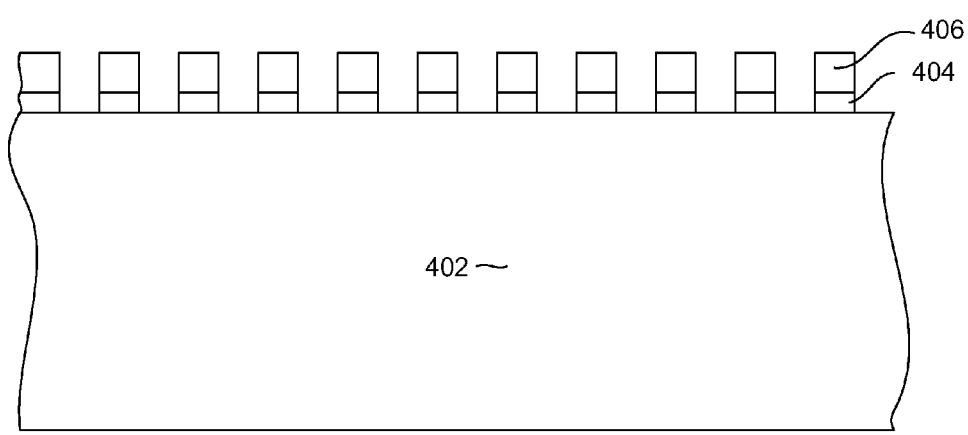
Figure 7:
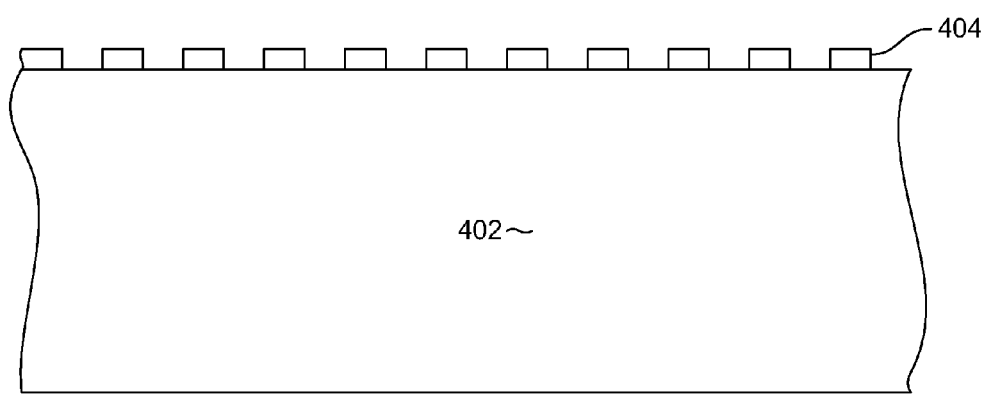

After patterning the photoresist mask as shown in FIG. 5, a reactive ion etching is performed to remove portions of the hard mask 404 that are not protected by the photoresist mask 406, thereby transferring the image of the photoresist mask 406 onto the underlying hard mask 404, leaving a structure as shown in FIG. 6. For the situation of using a block copolymer mask, an etching step will alter the surface that would promote the formation of the periodic block copolymer masking layer (once the block copolymer layer is applied). The first photoresist mask 406 can then be lifted off, leaving a structure as shown in FIG. 7.

Figure 8:
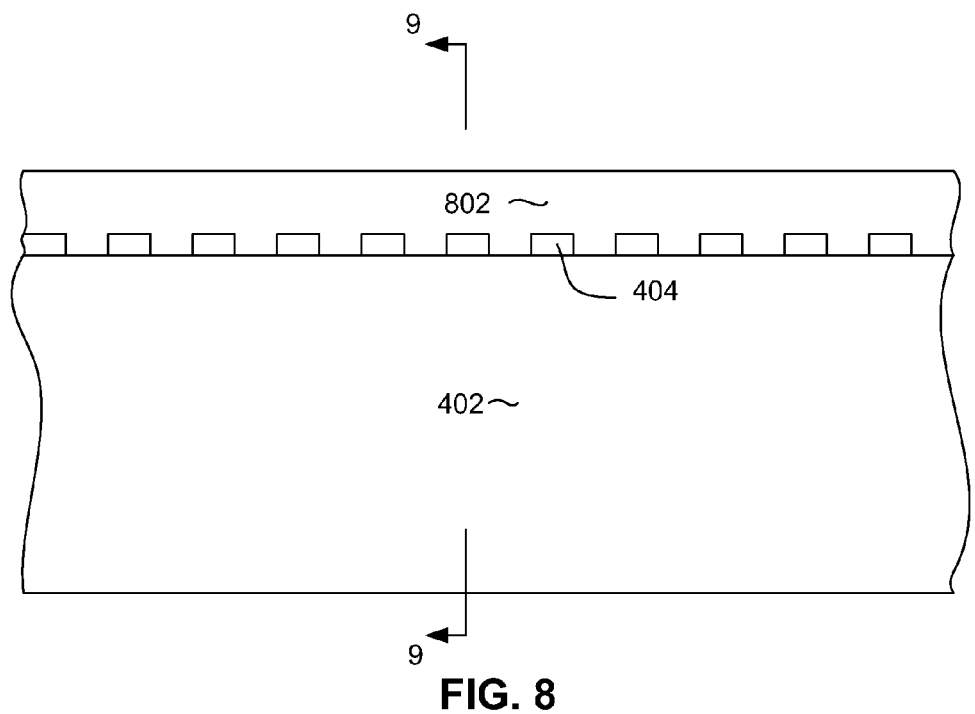
Figure 9:
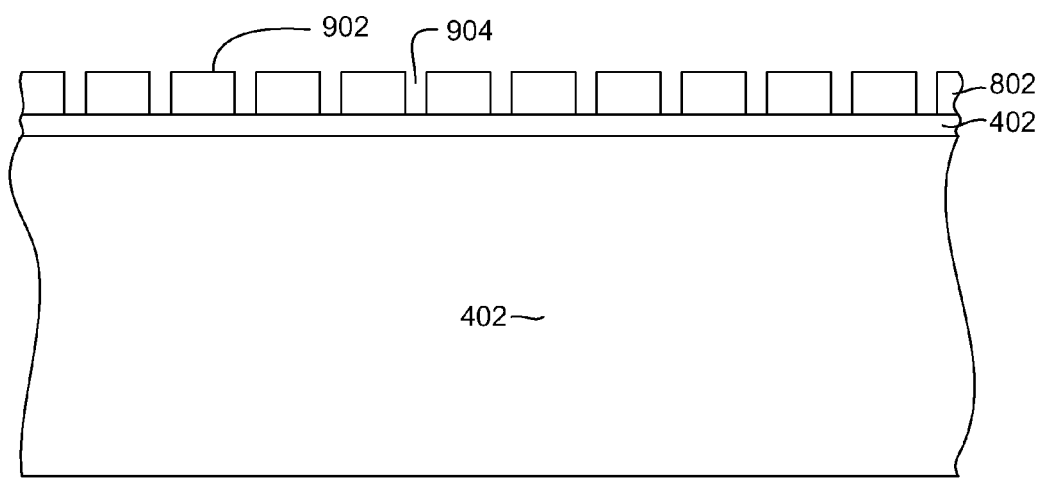
Figure 10:
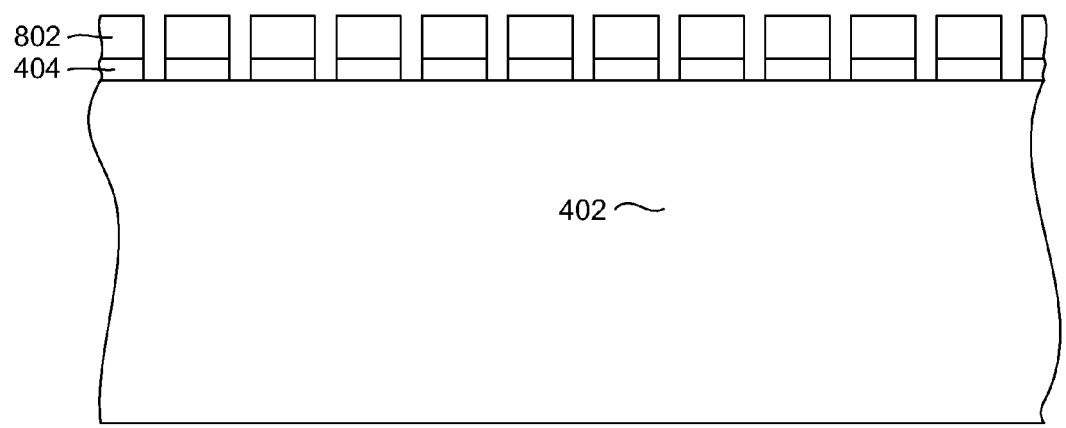
Figure 11:
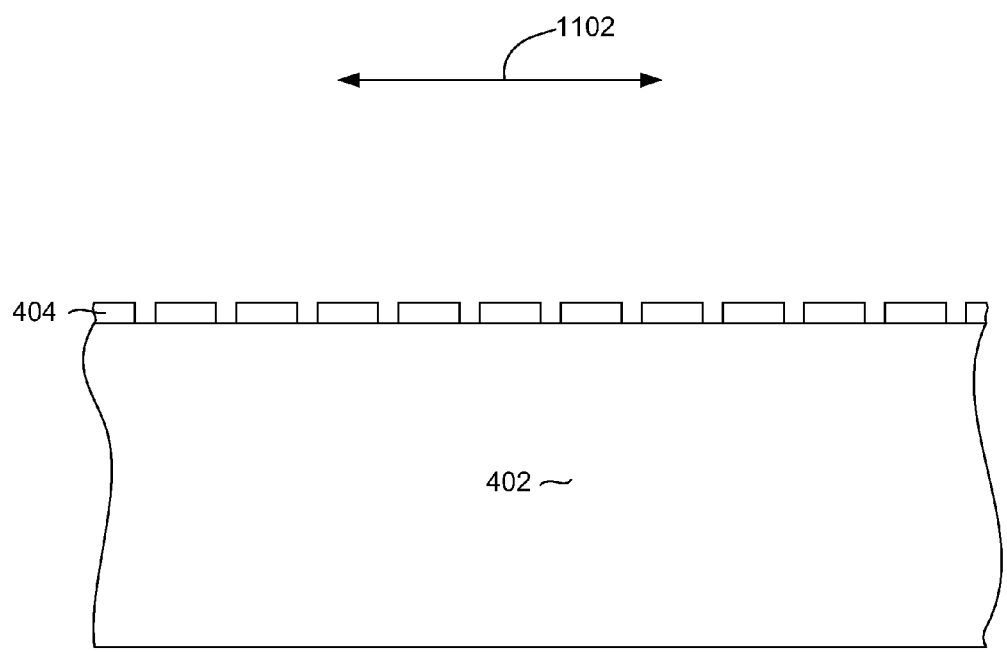
Figure 12:
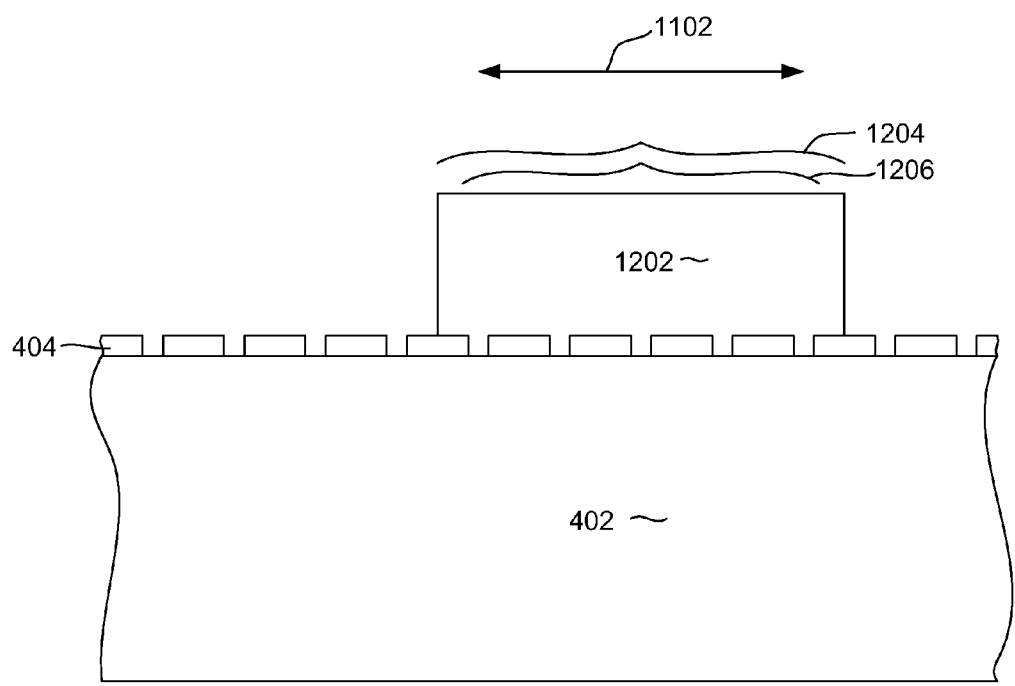

With reference now to FIGS. 8 and 9, another (second) layer of photoresist 802 is deposited. FIG. 9 shows a view of a cross section along a plane that is perpendicular to that of FIG. 8, as seen from line 9-9 of FIG. 8. As can be seen in FIG. 9, the photoresist layer 802 is lithographically patterned and developed to form a mask 802 that divides each of the data track into discrete bits of data. To this end, the mask 802 is formed with masked portions 902 and trench portions 904 that extend radially from the center of the wafer. The pattern of the mask 802 is then transferred onto the under-lying hard mask 404 by a process such as reactive ion etching in a fluorine containing plasma or a chlorine containing plasma to remove portions of the hard mask 404 that are not protected by this second mask 802. The mask 802 can then be removed, leaving a structure as shown in FIG. 11. The double ended arrow 1102 shows the direction of a data track, and as can be seen, the above masking process results in a hard mask structure 404 that is formed as concentric rings of data tracks consisting of discrete patterned bits of data.

A third photoresist mask 1202 is formed. This mask 1202 is deposited as a relatively thick layer of photoresist, and is configured to cover an extended servo track area. That is, the mask 1202 covers an extended servo area 1204 that is generally same shape as, but slightly wider than the actual servo area 1206. This extra width is to accommodate inevitable mask misalignment between different mask patterning steps, as will become clearer below.

Figure 13:
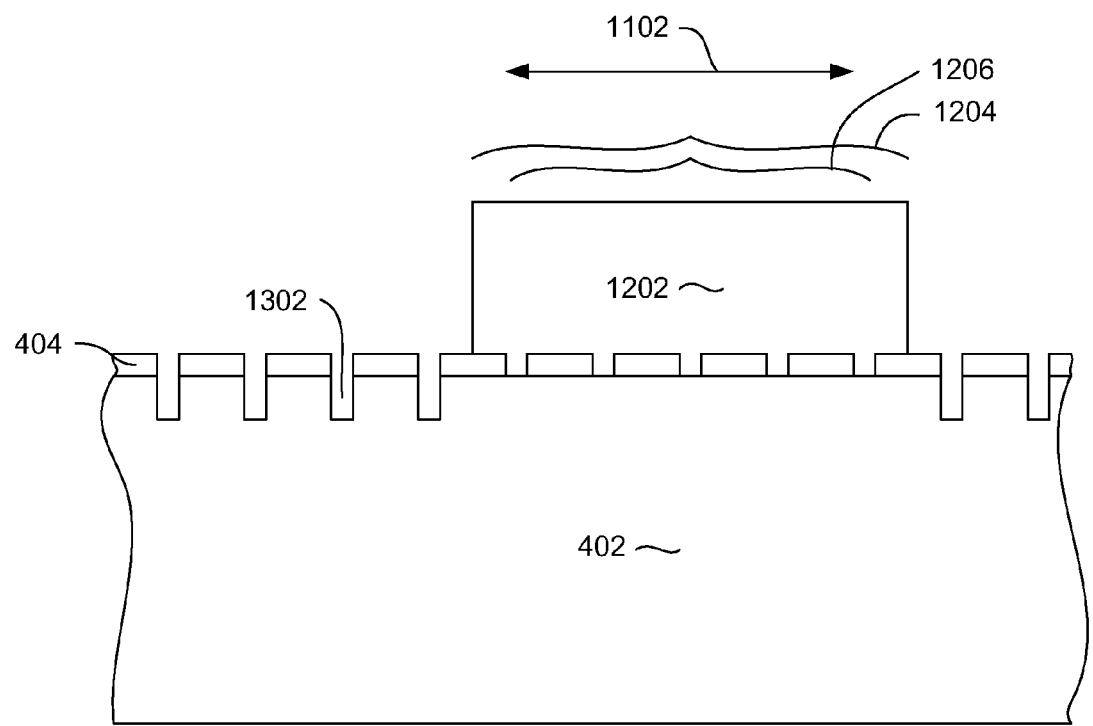

As can be seen then, the mask 1202 protects the servo area 1206. With this mask 1202 in place, a reactive ion etching is performed in a fluorine containing plasma to remove portions of the wafer material 402 not protected by the masks 404 and 1202 to form trenches 1302 in the data regions. This, thereby, transfers the image of the patterned data bits into the wafer 402 as shown in FIG. 13. The servo region is, however, protected by the photoresist mask 1202.

Figure 14:
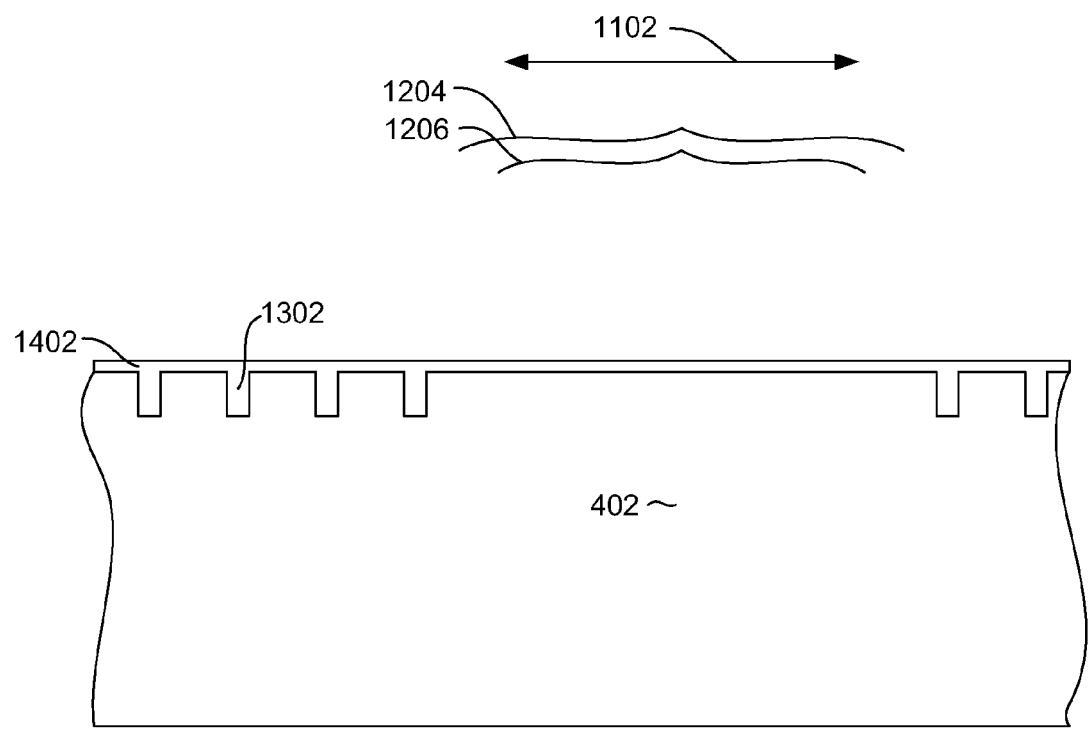
Figure 15:
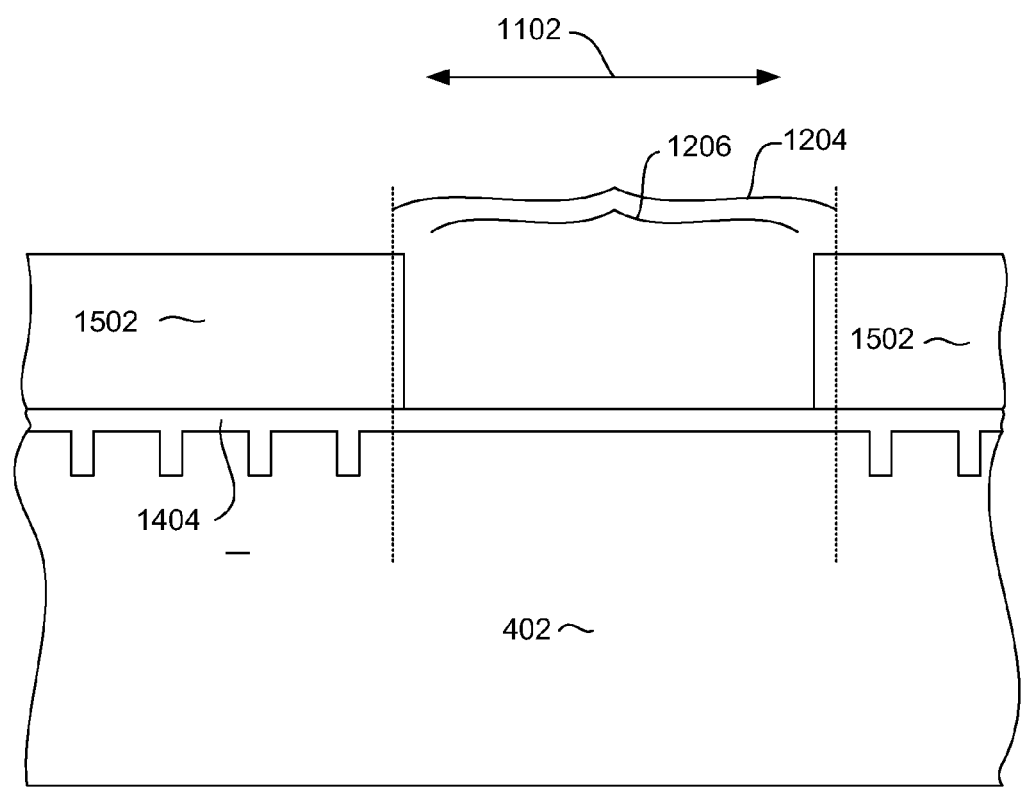

The photoresist mask 1202 can then be removed by a process such as wet chemical etching, and the hard mask 404 can be removed by a chemical process or reactive ion etching. Another layer of hard mask material 1402 is then deposited as shown in FIG. 14. Like the previously deposited hard mask layer 404 (FIG. 13) this layer 1402 can be constructed of a material such as Cr or a multilayer hard mask. Then, with reference to FIG. 15, another thick photoresist mask 1502 is lithographically patterned and developed. This mask 1502 is formed so as to cover the data regions outside of the servo region 1206, leaving the servo region 1206 uncovered. As those skilled in the art will appreciate, perfect alignment of separately patterned masks is impossible. Therefore, a certain amount of misalignment between the mask 1502 and the previous mask 802, 406, 1202 is to be expected and is acceptable. However, because the previously covered extended servo area 1204 is slightly larger than the actual servo area 1206, the mask 1502 can overlap into the extended servo region 1204 while still leaving the actual servo area 1206 uncovered. The opening in the mask 1502 may even extend slightly outside of the extended servo area 1204.

Figure 16:
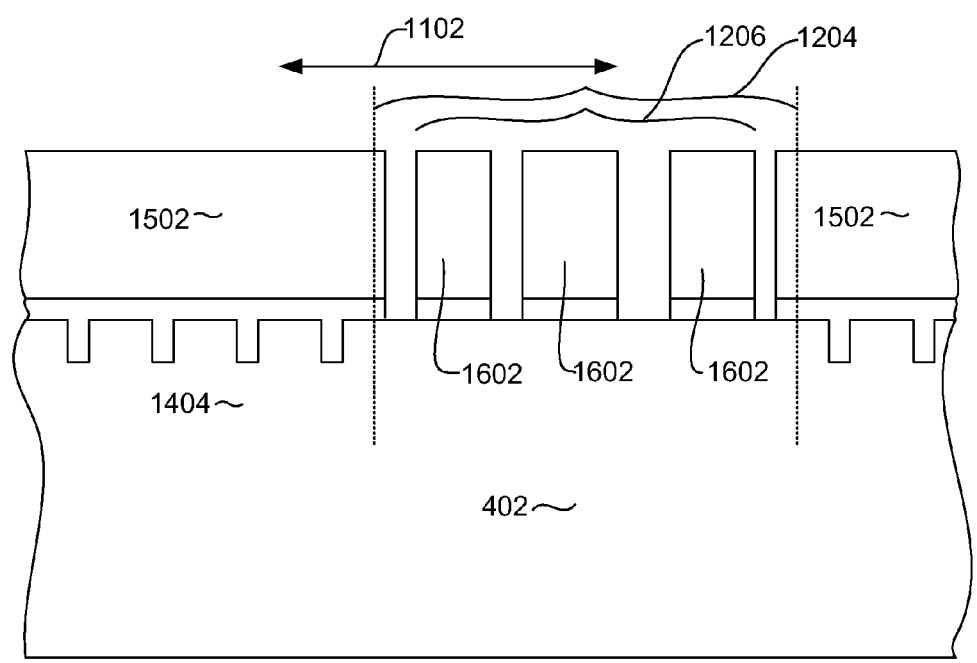
Figure 17:
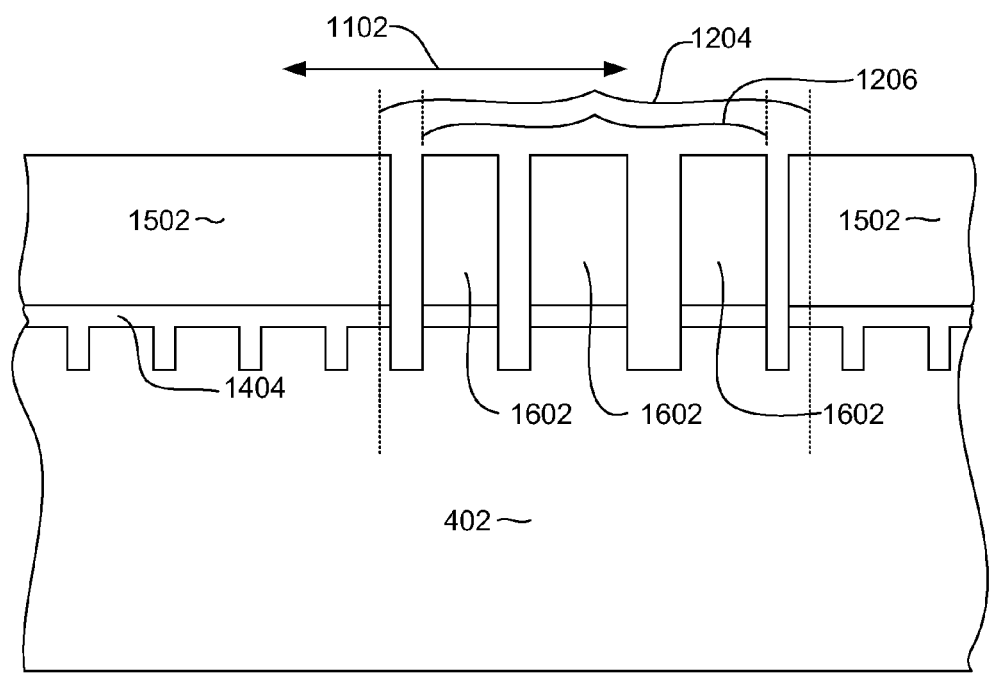

With reference now to FIG. 16, a different part of mask 1502 will have servo features 1602 in the servo area 1204 and is patterned to define a servo data patterning, such as the timing pattern bits 306 and servo data 312 described above with reference to FIG. 3. Therefore, the openings shown in the mask 1602 in FIG. 16 represent openings configured to define the various servo data bits (e.g. 306, 312 in FIG. 3).

Figure 19:
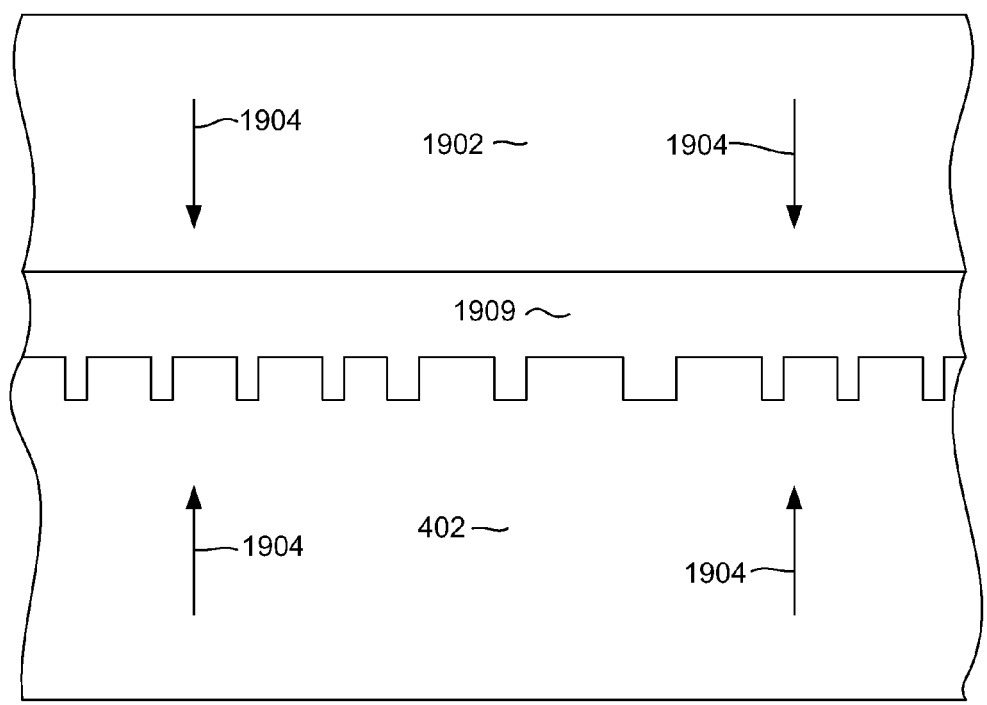

Now, with continued reference to FIG. 16, a reactive ion etching can be performed to remove portions of the hard mask layer 1404 that are not protected by the mask 1502, thereby transferring the image of the mask 1502 onto the underlying hard mask layer 1404. Then, with reference to FIG. 17 a material removal process such as reactive ion etching or ion milling is performed to remove portions of the wafer 402 that are not protected by the mask 1602 to transfer the pattern of the masks 1404, 1602 onto the underlying wafer. This, thereby, patterns the servo region. The masks 1502, 1404, can then be lifted off, leaving a structure as shown in FIG. 19.

Figure 18:
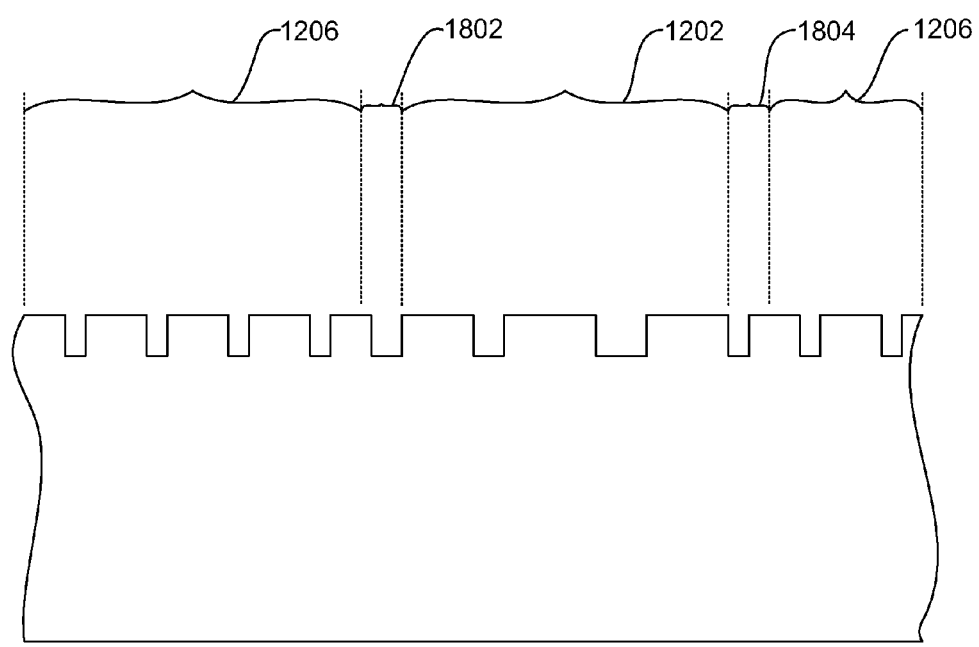

With continued reference to FIG. 18, it can be seen that the above described process allows for the manufacture of a wafer master die having both data regions and servo regions patterned, without one patterning process affecting the patterning of the other patterning process. It can also be seen, that the above described misalignment results in intermediate regions 1802, 1804 between the servo region 1202 and data regions 1806. These regions are a byproduct of the above process and do not contain any useful data for either recording data or servo data. It should also be pointed out that these regions 1802, 1804 are most likely (although not necessarily) assymetrical (having different widths from one another) due to the above described misalignment of the various mask patterning processes.

It will be recalled that the wafer 402, patterned as described above, is a master die for patterning an actual recording media. FIG. 19 shows how such a die can be used to pattern a media. FIG. 19 shows the master die 402 and smooth, flat magnetic media 1902. This magnetic media 1902 can be formed with various layers including a high coercivity top magnetic layer, magnetically soft under-layer, substrate, hard protective overcoat, etc. which are not shown in FIG. 19 for purposes of clarity. In order to form a desired bit pattern on the media 1902, the master die 402 is pressed against the magnetic media 1902 with high pressure as indicated by arrows 1904. There may also be a mold mask material 1909 that can act as the mask for media 1902. Therefore, it can be seen that the data and servo patterns formed on the die/wafer 402 are actually a negative image of the pattern to be formed on the magnetic media 1902.

Alternately, one could also use one hardmask 404 and multiple masking steps to collectively form the desired pattern in hard mask 404. Then, the data and servo can be etched in one step which would ensure that the depth of the etched trenches 1302 would be the same for both the data and servo regions.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A patterned magnetic media, comprising:
   first and second patterned data regions;
   a patterned servo region having first and second sides;
   a first intermediate region between the servo region and the first data region at the first side of the servo region; and
   a second intermediate region between servo region and the second data region at the second side of the servo region;
   wherein the first and second intermediate regions are asymmetrical with one another, one being wider than the other.

2. The magnetic media as in claim 1 wherein the first and second intermediate regions are data free regions that contain no data, the data free regions being located up-track and down-track from the servo region.

3. The magnetic media as in claim 1 wherein each of the first and second intermediate regions has a pattern that provides no useful servo information or data information.

4. The magnetic media as in claim 1 wherein the servo region includes a timing pattern and a servo pattern.

5. The magnetic media as in claim 1 wherein the data region includes a pattern of concentric tracks of individual bits.

6. The magnetic media as in claim 1 wherein the data region includes a pattern of concentric continuous tracks.

7. The magnetic media as in claim 2 wherein the data free regions are unequal in length as measured along a direction of a data track.

8. The magnetic media as in claim 1 further comprising alignment targets that record an overlay of masks used to create the patterned data region.

9. The magnetic media as in claim 1 further comprising alignment targets that record an overlay of masks used to create the patterned servo region.

10. A magnetic data recording system,
    a housing;
    a magnetic media mounted within the housing;
    an actuator; and
    a slider having a magnetic sensor and a magnetic write head formed thereon, the slider being connected with the actuator for movement adjacent to a surface of the magnetic medium;
    the magnetic media further comprising:
    first and second patterned data regions;
    a patterned servo region having first and second sides;
    a first intermediate region between the servo region and the first data region at the first side of the servo region; and
    a second intermediate region between servo region and the second data region at the second side of the servo region;
    wherein the first and second intermediate regions are asymmetrical with one another, one being wider than the other.

* * * * *